United States Patent [19]
Hirukawa et al.

[11] Patent Number: 5,731,060
[45] Date of Patent: Mar. 24, 1998

[54] HOLOGRAPHIC LAMINATE

[75] Inventors: Masahiro Hirukawa, Ise; Takashi Yamate, Matsusaka, both of Japan

[73] Assignee: Central Glass Company, Limited, Ube, Japan

[21] Appl. No.: 579,616

[22] Filed: Feb. 12, 1996

[51] Int. Cl.$^6$ ................................................ B32B 3/00
[52] U.S. Cl. .................... 428/195; 428/29; 428/142; 428/202; 428/325; 428/411.1; 428/480; 428/500; 428/520
[58] Field of Search .................. 430/1; 283/6; 428/29, 428/141, 412, 411.1, 142, 195, 202, 325, 480, 500, 520

[56] References Cited

U.S. PATENT DOCUMENTS

| | | | |
|---|---|---|---|
| 5,066,525 | 11/1991 | Nakamachi et al. | 428/29 |
| 5,095,375 | 3/1992 | Bolt | 359/1 |
| 5,153,751 | 10/1992 | Ishikawa et al. | 359/13 |
| 5,331,444 | 7/1994 | Biles | 359/3 |
| 5,335,099 | 8/1994 | Smith | 359/15 |
| 5,413,863 | 5/1995 | Weber et al. | 428/428 |
| 5,453,338 | 9/1995 | Suga et al. | 430/1 |
| 5,455,129 | 10/1995 | Bussard | 430/1 |

*Primary Examiner*—William Krynski
*Attorney, Agent, or Firm*—Evenson, McKeown, Edwards & Lenahan, PLLC

[57] ABSTRACT

A holographic laminate to be used in a vehicular windshield or windowpane and an architectural window glass in order to display a variety of images for the expressive and decorative purposes. The holographic laminate comprises a transparent plate on which a hologram is mounted. An ultraviolet ray absorbing film is disposed on a side of the hologram through which side sunlight enter the hologram. A layer of an adhesive is disposed to secure the hologram to the transparent plate layer. A barrier film is disposed between the hologram and the adhesive layer to protect the hologram from being chemically affected by the adhesive layer.

12 Claims, 4 Drawing Sheets

HOLOGRAPHIC LAMINATE

BACKGROUND OF THE INVENTION

1. Field of the Invention

This invention relates to improvements in a holographic laminate used in a vehicular windshield or windowpane and an architectural window glass in order to reconstruct a variety of images for the expressive and decorative purposes.

2. Description of the Prior Art

In recent years, attention has been paid on application of a hologram arrangement or laminate in the field of automotive vehicles, in which the hologram arrangement is mounted on an automotive vehicle rear windowpane to be used as a highly mounted stop lamp, or on an automotive vehicle front windshield to be used as a head-up display. In connection with such applications of the hologram arrangement, a variety of propositions have been made or put into practical use.

A typical example of such applications for the hologram arrangement is configurated as follows: A hologram is mounted on a transparent plate such as the automotive vehicle windowpane and secured in position with an adhesive layer in such a manner that the adhesive layer cover the flat surface and the side edge surface of the hologram. A protective layer is formed on the adhesive layer. Another typical example is configurated as follows: The hologram is bonded to the transparent plate with a double coated adhesive tape. The hologram is covered with a protective layer having an adhesive.

However, drawbacks have been encountered in the above discussed conventional holographic arrangements, in which the hologram is unavoidably deteriorated under the effects of sunlight and the adhesive so that the color tone and brightness of the hologram are degraded upon use of the holographic arrangements.

SUMMARY OF THE INVENTION

It is an object of the present invention to provide an improved holographic laminate which can overcome the drawbacks encountered in conventional holographic arrangements or laminates.

Another object of the present invention is to provide an improved holographic laminate which is high in durability even under a long exposure to the sunlight and employment of an adhesive in the laminate.

A further object of the present invention is to provide an improved holographic laminate in which a hologram can be effectively prevented from being changed in color tone and lowered in brightness under a long exposure to sunlight, while being prevented from being deteriorated under the effect of an adhesive used in the laminate.

An aspect of the present invention resides in a holographic laminate comprising a transparent plate. A hologram is mounted on the transparent plate. An ultraviolet ray absorbing film is disposed on a side of the hologram through which side the sunlight enter the hologram. A layer of an adhesive is disposed to secure the hologram to the transparent plate. A barrier film is disposed between the hologram and the adhesive layer.

Another aspect of the present invention resides in a holographic laminate comprising a transparent plate including means for absorbing ultraviolet ray. A hologram is mounted on the transparent plate. A layer of an adhesive is disposed to secure the hologram to the transparent plate. A barrier film is disposed between the hologram and the adhesive layer.

The present inventors have found that the hologram in the holographic laminate containing adhesive is changed in color tone and lowered in brightness under a long exposure to the sunlight, if no ultraviolet ray absorbing film is disposed between the hologram and a sunlight entering direction. Additionally, it has been recognized by the inventors that the hologram makes its color tone change and brightness lowering under contact with the adhesive, which has been supposed to be resulting from the effects of the plasticizer and/or the cross linking agent contained in the adhesive. In view of this, the inventors have devised using means for absorbing ultraviolet ray on a sunlight entering side of the hologram, and using a barrier film between the hologram and the adhesive. As a result, the hologram can be effectively prevented from being changed in color tone and lowered in brightness even under a long exposure to sunlight, while being prevented from being deteriorated under the effect of adhesives used in the laminate. Thus, the hologram in the holographic laminate can be largely improved in durability.

BRIEF DESCRIPTION OF THE DRAWINGS

In the drawings, like reference numerals designate like elements or matters throughout all figures, in which.

DETAILED DESCRIPTION OF THE INVENTION

Figure 1:
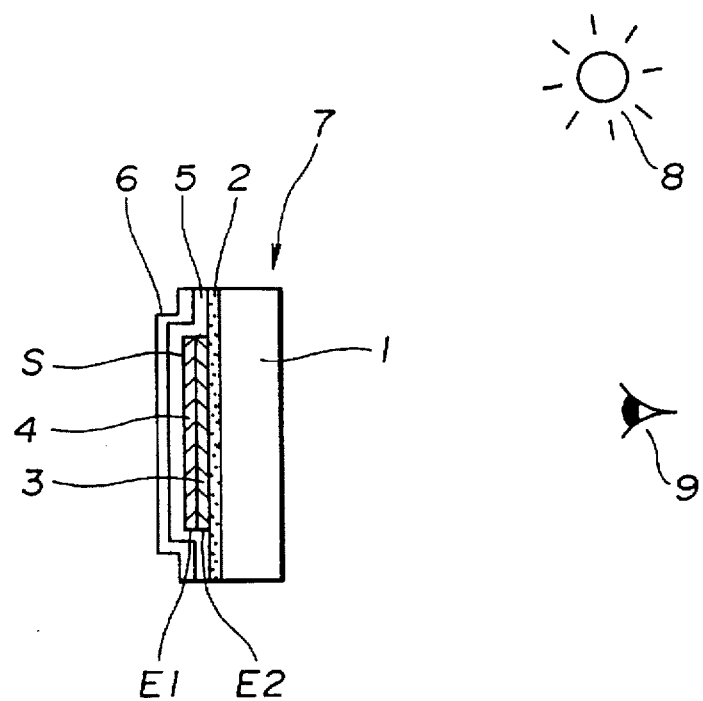
FIG. 1 is a schematic fragmentary sectional view of a first embodiment of a holographic laminate according to the present invention.

Referring now to FIG. 1, a first embodiment of a holographic laminate according to the present invention is illustrated by the reference numeral 7. The holographic laminate 7 comprises a hologram 3 which is prepared as follows: First, a light-sensitive material is coated on a substrate 4 made of, for example, polyethylene terephthalate (PET). The light-sensitive material includes, as main components, a first mixture of a vinyl monomer(s) such as pentaerythritol triacrylate, trimethylol propane triacrylate and/or triethyleneglycol diacrylate, methyl methacrylate and methacrylic acid; and a second mixture including cellulose acetate succinate and a saturated polymer such as polyvinyl alcohol or a unsaturated polymer such as unsaturated polyether or unsaturated polyester. The light-sensitive material further includes a sensitizer and/or a photopolymerization initiator, if necessary. The light-sensitive material is irradiated with laser beam or ultraviolet rays to polymerize the light-sensitive material thereby forming a photographic plate (not identified) including a photopolymer corresponding to the light-sensitive material. A surface of the photographic plate is irradiated in two directions with laser beams to form interference fringes thereon, in such a manner as to make a reconstructed image in green color under the condition of the reconstruction. Thereafter, the photographic plate is developed to thereby obtain the hologram 3 of the transmission type or the reflection type, in a state of being fixedly mounted on the substrate 4.

A transparent plate 1 formed of glass plate or the like is coated with an ultraviolet ray absorbing film 2. Coating of the film 2 is carried out as follows: First, 2, 5-bisthiophene (trade made "UVITEX-OB" of Ciba-Geigy) serving as a ultraviolet ray absorbing agent is added to an acrylic resin system primer (containing acrylic resin as a main component) to prepare a solution. The solution is coated on the surface of the transparent plate 1, and heated to be hardened. Thereafter, a solution for forming a silicone resin system hard coat (containing silicone resin as a main component) is coated on the hardened solution containing the primer and hardened to form the ultraviolet ray absorbing film 2.

The hologram 3 with the substrate 4 is laminated on the transparent plate 1 with the ultraviolet ray absorbing film 2 in such a manner that the hologram 3 is in contact with the ultraviolet ray absorbing film 2. The hologram 3 and the ultraviolet ray absorbing film 2 are bonded to each other by a laminator or laminating machine. It is to be noted that the substrate plate 4 for the hologram 3 serves as a barrier film for protecting the hologram from being chemically affected, and therefore is not peeled off from the hologram 3.

A protective layer 6 is formed of a vinyl chloride resin system film (containing vinyl chloride resin as a main component) and coated with an acrylic resin system adhesive 5. Such a vinyl chloride resin system film with the acrylic resin system adhesive 5 is readily available as a high durability marking film and sold under the trade name "DAITAC (for example, M-1240, M-1300 and the like)" by Dainippon Ink and Chemicals, Inc. in Japan. The protective layer 6 with the adhesive 5 is bonded to cover the hologram 3 and the substrate plate 4 in such a manner that the adhesive is in contact with the flat surface S and the side edge surface E1 of the substrate 4 and the side edge surface E2 of the hologram 3 as clearly shown in FIG. 1.

The thus produced holographic laminate 7 was subjected to an accelerated weathering test for 2000 hours which test included repeated test cycles each of which included a light irradiation for 120 minutes and a rain-fall for 18 minutes upon setting the temperature within a test bath (containing the holographic laminate 7) at 63° C. (measured by a black panel thermometer), using a carbon arc lamp type sunshine weatherometer (the trade name "WEL-SUN-HMC") produced by Suga Test Instruments Co., Ltd. in Japan. The accelerated weathering test is according to JIS (Japanese Industrial Standard) No. A 1415. As a result, even after the above accelerated weathering test, the color tone (green) reconstructed at the hologram 3 of the holographic laminate 7 was maintained in a state obtained before the test. Additionally, the brightness reconstructed was also maintained unchanged in a state obtained before the test. Thus, the holographic laminate 7 of FIG. 1 exhibited an excellent durability. Such a good result is supposed to be resulted from the fact that the substrate 4 (made of polyethylene terephthalate) for the hologram 3 serves as the barrier film, and the fact that the ultraviolet ray absorbing film 2 protects the hologram 3 from being exposed to ultraviolet rays.

Accordingly, the holographic laminate 7 exhibits a sufficient durability even if used in a vehicular or architectural window glass which is located as shown in FIG. 1 in which the sunlight from the sun 8 is irradiated onto the side of the transparent plate 1. In this case, the green color of the hologram 3 can be reconstructed under the action of the sunlight from the sun 8 or other light sources (not shown), and recognized by human's eyes 9 as shown in FIG. 1.

Figure 2:
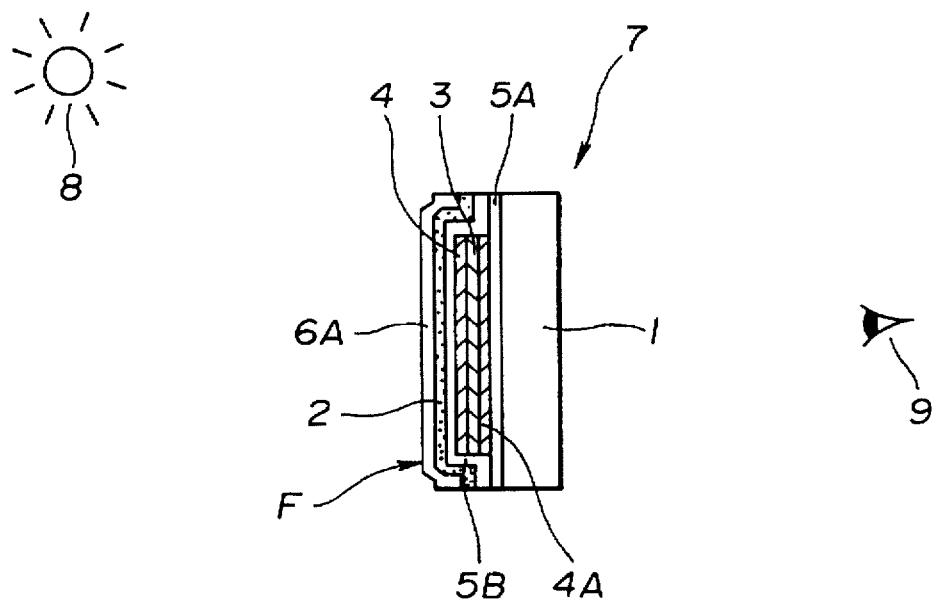
FIG. 2 is a schematic fragmentary sectional view of a second embodiment of the holographic laminate according to the present invention.

FIG. 2 illustrates a second embodiment of the holographic laminate 7 of the present invention, similar to that of FIG. 1. In this embodiment, an adhesive 5A of the double coated tape (wherein adhesive is coated on opposite side surfaces of a transparent tape) or the tape is bonded to the transparent plate 1 formed of glass plate or the like. The hologram 3 (obtained as same as that in the embodiment of FIG. 1) with the substrate or barrier film 4 is laminated on the adhesive 5A through another barrier film 4A made of polyethylene terephthalate (PET). An ultraviolet ray cutting (absorbing) film F serving also to prevent scattering of glass is bonded onto and to cover the barrier film 4. The ultraviolet ray cutting film F is readily available under the trade name "Rumikuru No. 1501" manufactured by TORAY CO., LTD. in Japan and includes an ultraviolet ray absorbing film 2 having a substrate of polyethylene terephthalate (PET). The ultraviolet ray absorbing film 2 is provided at its one side surface with a protective layer or hard coat layer 6A and at its opposite side surface with an adhesive 5B. The ultraviolet ray cutting film F is laminated on the barrier film 4 in such a manner that the adhesive 5B is in contact with the barrier film 4.

The thus formed holographic laminate 7 was subjected to the accelerated weathering test for 1000 hours in a manner similar to that for the first embodiment of FIG. 1. As a result, even after this accelerated weathering test, the color tone (green) reconstructed at the hologram 3 of the holographic laminate 7 was maintained in a state obtained before the test, and the brightness reconstructed was also maintained unchanged in a state obtained before the test. Thus, the holographic laminate 7 of FIG. 2 exhibited an excellent durability which is generally equal to that in the holographic laminate 7 of FIG. 1. Such a good result is supposed to be resulted from the fact that the substrate 4 (made of polyethylene terephthalate) for the hologram 3 serves as the barrier film, and the fact that the ultraviolet ray absorbing film F protects the hologram 3 from being exposed to ultraviolet rays. Accordingly, the holographic laminate 7 exhibits a sufficient durability even if used in a vehicular or architectural window glass which is located as shown in FIG. 2 in which the sunlight from the sun 8 is irradiated onto the opposite side relative to the transparent plate 1. In this case, the green color of the hologram 3 can be reconstructed under the action of the sunlight from the sun 8 or other light sources (not shown), and recognized by human's eyes 9 as shown in FIG. 2.

Figure 3:
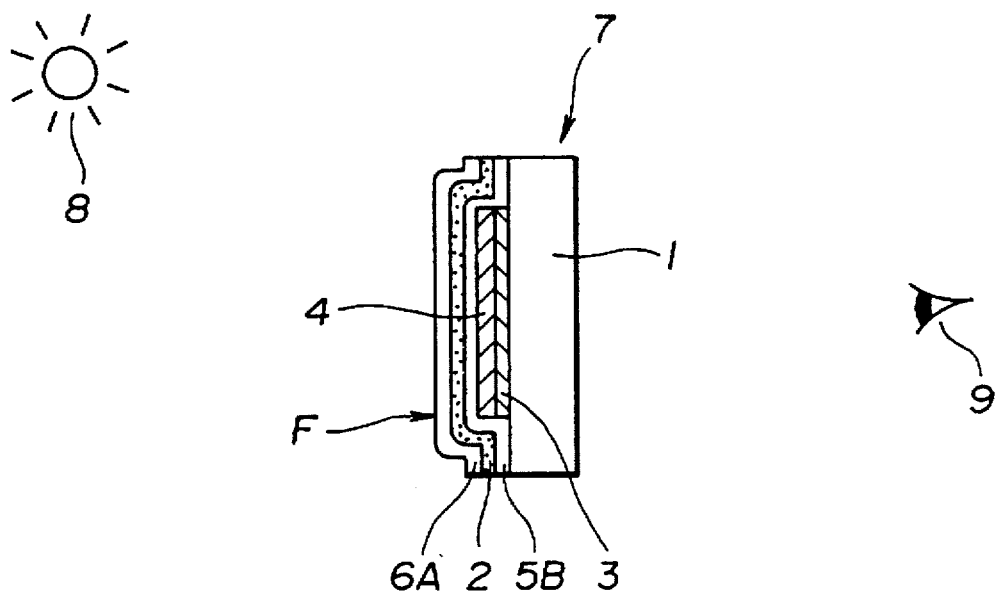
FIG. 3 is a schematic fragmentary sectional view of a third embodiment of the holographic laminate according to the present invention.

FIG. 3 illustrates a third embodiment of the holographic laminate of the present invention, which is similar to that of FIG. 2. In this embodiment, the hologram 3 (obtained as same as that in the embodiment of FIG. 1) with the substrate or barrier film 4 is laminated on the transparent plate 1. The ultraviolet ray cutting film F for the purpose of preventing scattering of glass is bonded onto and to cover the substrate 4 and the hologram 3. The ultraviolet ray cutting film F is readily available under the trade name "Rumikuru No. 1501" manufactured by TORAY CO., LTD. in Japan and includes an ultraviolet ray absorbing film 2 having a substrate of polyethylene terephthalate (PET). The ultraviolet ray absorbing film 2 is provided at its one side surface with a protective layer or hard coat layer 6A and at its opposite side surface with an adhesive 5B. The ultraviolet ray cutting film F is laminated on the barrier film 4 in such a manner that the adhesive 5B is in contact with the substrate 4.

The thus formed holographic laminate 7 was subjected to the accelerated weathering test for 1000 hours in a manner similar to that for the first embodiment of FIG. 1. As a result, even after this accelerated weathering test, the color tone (green) reconstructed at the hologram 3 of the holographic laminate 7 was maintained in a state obtained before the test, and the brightness reconstructed was also maintained unchanged in a state obtained before the test. Thus, the holographic laminate 7 of FIG. 3 exhibited an excellent durability which is generally equal to that in the holographic laminate 7 of FIG. 1. Such a good result is supposed to be resulted from the fact that the substrate 4 (made of polyethylene terephthalate) for the hologram 3 serves as the barrier film, and the fact that the ultraviolet ray absorbing film F protects the hologram 3 from being exposed to ultraviolet rays. Accordingly, the holographic laminate 7 exhibits a sufficient durability even upon being used in a vehicular or architectural window glass which is located as shown in FIG. 3 in which the sunlight from the sun 8 is irradiated onto the opposite side relative to the transparent plate 1. In this case, the green color of the hologram 3 can be reconstructed under the action of the sunlight from the sun 8 or other light sources (not shown), and recognized by human's eyes 9 as shown in FIG. 3.

While only arrangements of FIGS. 1 to 3 have been shown and described as embodiments of the present invention, it will be appreciated that the principle of the present invention is applicable to other arrangements, and that a variety of modifications can be made to the arrangements of FIGS. 1 to 3. Concerning the above-mentioned ultraviolet ray absorbing film F, a variety of ultraviolet ray absorbing films other than those used in the embodiments may be used as the ultraviolet ray absorbing film F as a part of the present invention if the ultraviolet ray absorbing films have an ultraviolet ray absorption edge residing at a wave length not lower than 350 nm, preferably not lower than 380 nm because the ultraviolet ray absorption edge of a light-sensitive material or recording medium (such as a photopolymer) for the hologram resides near 350 nm, in which it is a matter of course that the ultraviolet ray absorbing films are required to allow visible light to pass therethrough. The ultraviolet ray absorbing films may include one which is prepared by adding a fluorescent bleaching agent to the ultraviolet ray absorbing film 2 of the first embodiment of FIG. 1, or a zinc oxide film which is prepared by coating fatty acid compound containing metallic zinc on a substrate and then by firing the compound.

Concerning the barrier film 4, although only the barrier film 4 made of polyethylene terephthalate has been shown and described, it will be understood that the barrier film 4 may be replaced with other transparent films which cannot chemically react with the hologram even upon contacting with the hologram and can prevent plasticizer, cross linking agent and the like from diffusing and penetrating into the hologram. In this regard, the barrier film 4 may be made of polyvinyl alcohol or the like. In case that a substrate film for supporting the light-sensitive material such as the photopolymer has a function as a barrier for protecting the hologram from being chemically affected by the adhesive, the substrate may be used as the barrier film 4 forming part of the present invention, as it is.

Concerning the protective layer 6, while only the protective layer 6 formed of a vinyl chloride resin system film has been shown and described, it will be understood that the protective layer 6 may be replaced with a LLumar Window Film (the trade name of Martin Processing Inc. in Singapore) which includes a substrate film made of polyethylene terephthalate and provided at its opposite respective surfaces with a hard coat layer and an adhesive of acrylic resin system.

Concerning the transparent plate 1, it will be appreciated that the transparent plate 1 may be made of a transparent resin such as polycarbonate or acrylic resin, other than the glass plate. The transparent plate 1 may be supplied with a ultraviolet ray absorbing ability by adding a ultraviolet ray absorbing compound(s) thereto.

The holographic laminate of the present invention can be used as a head-up display upon being disposed on a vehicular front windshield, as a highly mounted stop lamp upon being disposed on a vehicular rear windowpane, and as a turn indicator light, and additionally for the purpose of displaying a variety of images (for example, three-dimensional images) and a variety of decorative images upon being disposed on an architectural window glass, a partition glass plate, and a small-sized glass plate.

While the holographic laminates 7 of FIGS. 1 to 3 have been shown and described as being arranged to be viewed from the side of the transparent plate 1 with human's eyes to recognize the reconstructed image, it will be understood that the holographic laminates 7 may be arranged to be viewed from the opposite side relative the transparent plate 1 or the side of the protective layer 6, 6A.

Figure 4:
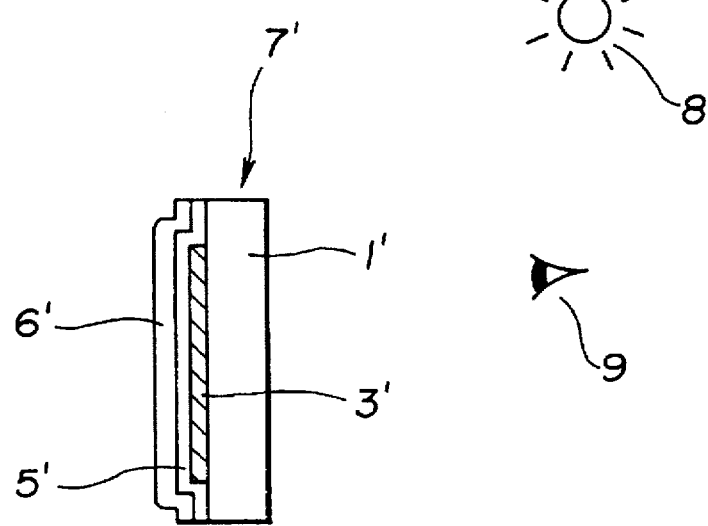
FIG. 4 is a schematic fragmentary sectional view of a first conventional example holographic laminate.

FIG. 4 shows a first conventional example holographic laminate 7' which is presented for the performance comparison purpose relative to the above holographic laminates 7 according to the present invention. The holographic laminate 7 includes a hologram 3' which is laminated on a transparent plate 1'. An adhesive 5' is put on the hologram 3' in a manner to fix the hologram 3' to the surface of the transparent plate 1. A protective layer 6' is laminated to be in contact with the adhesive 5' thereby to serve as a top layer.

Figure 5:
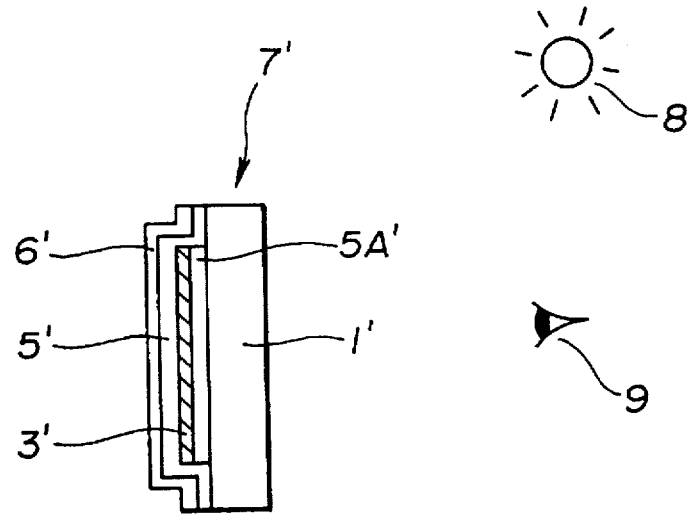
FIG. 5 is a schematic fragmentary sectional view of a second conventional example holographic laminate.

FIG. 5 shows a second conventional example holographic laminate 7' which is similar to that of FIG. 1 with the exception that the hologram 3' is bonded to the surface of the transparent plate 1' with an adhesive 5A'.

The above conventional holographic laminates 7' of FIGS. 4 and 5 were subjected to the accelerated weathering test for 1000 hours in a manner similar to that for the first embodiment of FIG. 1. As a result, after this accelerated weathering test, the color tone reconstructed at the hologram 3' of the holographic laminate 7' was changed from green (obtained before the test) to blue, and the brightness reconstructed was largely lowered to a level of not higher than 10% of that obtained before the test, with respect to both the conventional examples of FIGS. 4 and 5. Thus, evaluation for the conventional example holographic laminates 7', 7' are very low and therefore are not suitable for practical use.

Figure 6:
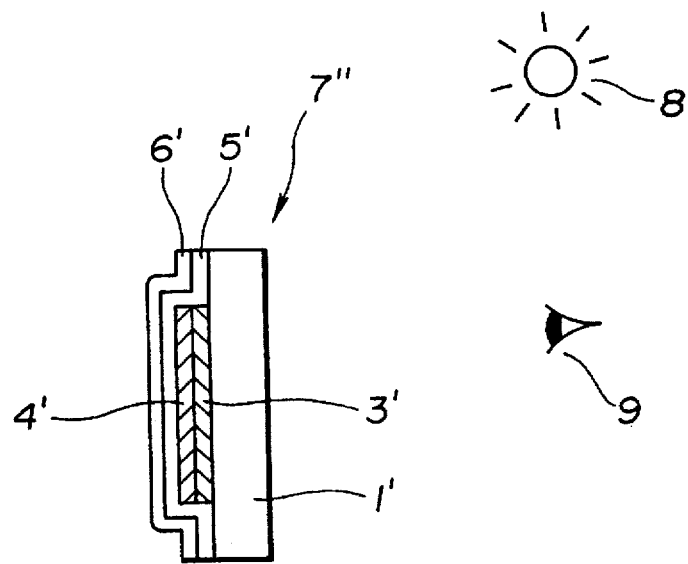
FIG. 6 is a schematic fragmentary sectional view of a first comparative example holographic laminate.

FIG. 6 shows a first comparative example holographic laminate 7" which is presented for the performance comparison purpose relative to the holographic laminates 7 according to the present invention. The holographic laminate 7" is similar to that of FIG. 4 with the exception that a barrier film 4' made of polyethylene terephthalate (PET) is provided between the hologram 3 and the adhesive 5.

Figure 7:
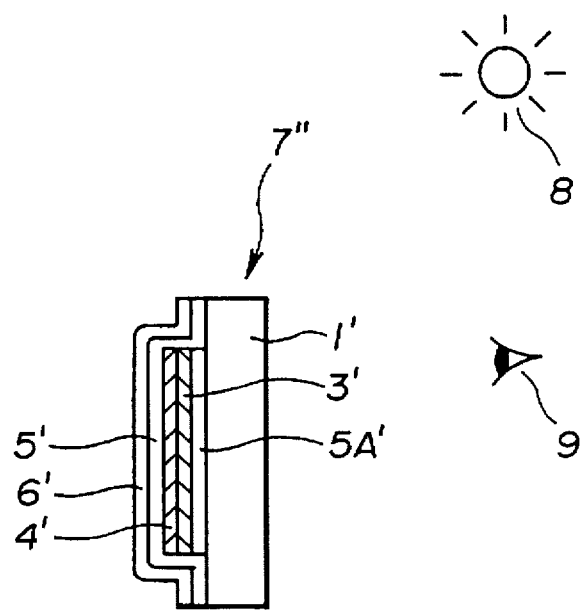
FIG. 7 is a schematic fragmentary sectional view of a second comparative example holographic laminate.

FIG. 7 shows a second comparative example holographic laminate 7" which is similar to that of the second conventional example of FIG. 6 with the exception that a barrier film 4' is disposed between the hologram 3' and the adhesive 5'.

Figure 8:
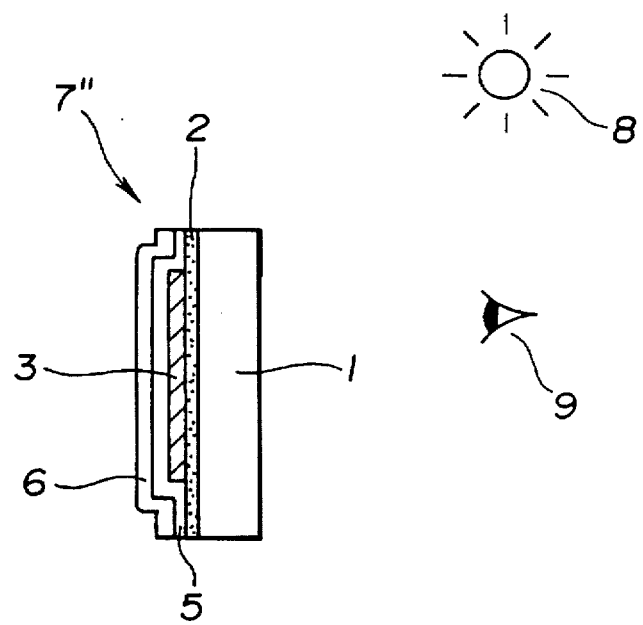
FIG. 8 is a schematic fragmentary sectional view of a third comparative example holographic laminate.

FIG. 8 shows a third comparative example holographic laminate 7" which is similar to that of the first embodiment of FIG. 1 with the exception that the barrier film 4 is omitted.

The first to third comparative example holographic laminates 7" were subjected to the accelerated weathering test for 1000 hours in a manner similar to that for the first embodiment of FIG. 1. As a result, concerning the third comparative example of FIG. 8, after this accelerated weathering test, the color tone reconstructed at the hologram 3 of the holographic laminate 7" was changed from green (obtained before the test) to blue, and the brightness reconstructed was largely lowered to a level of not higher than 10% of that obtained before the test. Concerning the first and second comparative examples of FIGS. 6 and 7, after the accelerated weathering test, the color tone reconstructed at the hologram 3' was changed from green (obtained before the test) to blue, and the brightness reconstructed was largely lowered to an about half level (about 50%) of that obtained before the test. Thus, evaluation for the comparative example holographic laminates 7" is not good so that the holographic laminates 7" may be usable only under a particular condition.

What is claimed is:

1. A holographic laminate comprising:
   a single transparent plate;
   a hologram mounted on said transparent plate;
   an ultraviolet ray absorbing film disposed on a side of said hologram through which direct rays of sunlight enter said hologram, said ultraviolet ray absorbing film functioning only for absorbing ultraviolet rays;
   a layer of an adhesive by which said hologram is secured to said transparent plate;
   a first barrier film disposed between said hologram and said adhesive layer; and
   a protective layer forming an outer layer on a side opposite to the transparent plate.

2. A holographic laminate as claimed in claim 1, further comprising a protective film to which said adhesive layer is attached, wherein said ultraviolet ray absorbing film is formed on said transparent plate, said hologram and said first barrier film being attached to each other, said hologram being attached to said ultraviolet ray absorbing film, and said barrier film being attached to said adhesive layer.

3. A holographic laminate as claimed in claim 2, wherein said protective layer and said adhesive layer cover a surface and a side edge surface of said hologram and said barrier film, and are bonded to said ultraviolet ray absorbing film.

4. A holographic laminate as claimed in claim 1, further comprising a double coated adhesive tape disposed between said transparent plate and said first barrier film, an ultraviolet ray absorbing layer including said adhesive layer, and a second barrier film disposed between said hologram and said ultraviolet ray absorbing layer, wherein said barrier film is bonded to said transparent plate through said double coated adhesive tape, said hologram being attached to said first barrier film, said second barrier film being attached to said hologram and located at an opposite side of said hologram relative to said first barrier film, said adhesive layer of said ultraviolet ray absorbing layer being attached to said second barrier film.

5. A holographic laminate as claimed in claim 4, wherein said ultraviolet ray absorbing layer covers a surface and a side edge surface of said hologram and said first and second barrier film and bonded to said transparent plate through said double coated adhesive tape.

6. A holographic laminate as claimed in claim 1, wherein said hologram is attached to said transparent plate, said barrier film being attached to said hologram, said adhesive layer being disposed between and attached to said barrier film and said ultraviolet ray absorbing film.

7. A holographic laminate as claimed in claim 6, wherein said ultraviolet ray absorbing layer and said adhesive layer cover a surface and a side edge surface of said hologram and said barrier film, said ultraviolet ray absorbing layer being bonded to said transparent plate through said adhesive layer.

8. A holographic laminate as claimed in claim 1, wherein said barrier film is a substrate on which a light-sensitive material is coated during production of said hologram, the light-sensitive material corresponding to said hologram.

9. A holographic laminate as claimed in claim 1, wherein said barrier film is transparent and prevents said hologram from being chemically affected by said adhesive.

10. A holographic laminate as claimed in claim 9, wherein said barrier film prevents a component of said adhesive from entering said hologram.

11. A holographic laminate as claimed in claim 9, wherein said barrier film is made of a material selected from the group consisting of polyethylene terephthalate and polyvinyl alcohol.

12. A holographic laminate comprising:
   a single transparent plate including a film for absorbing ultraviolet rays,
   a hologram mounted on said transparent plate;
   a layer of an adhesive by which said hologram is secured to said transparent plate; and
   a barrier film disposed between said hologram and said adhesive layer to prevent said hologram from being chemically affected; and
   a protective layer forming an outer layer on a side opposite to the transparent plate.

* * * * *